No. 763,871. PATENTED JUNE 28, 1904.
F. L. FISHER.
COMBINED BRAKE AND MUD GUARD.
APPLICATION FILED JAN. 6, 1904.
NO MODEL. 2 SHEETS—SHEET 1.
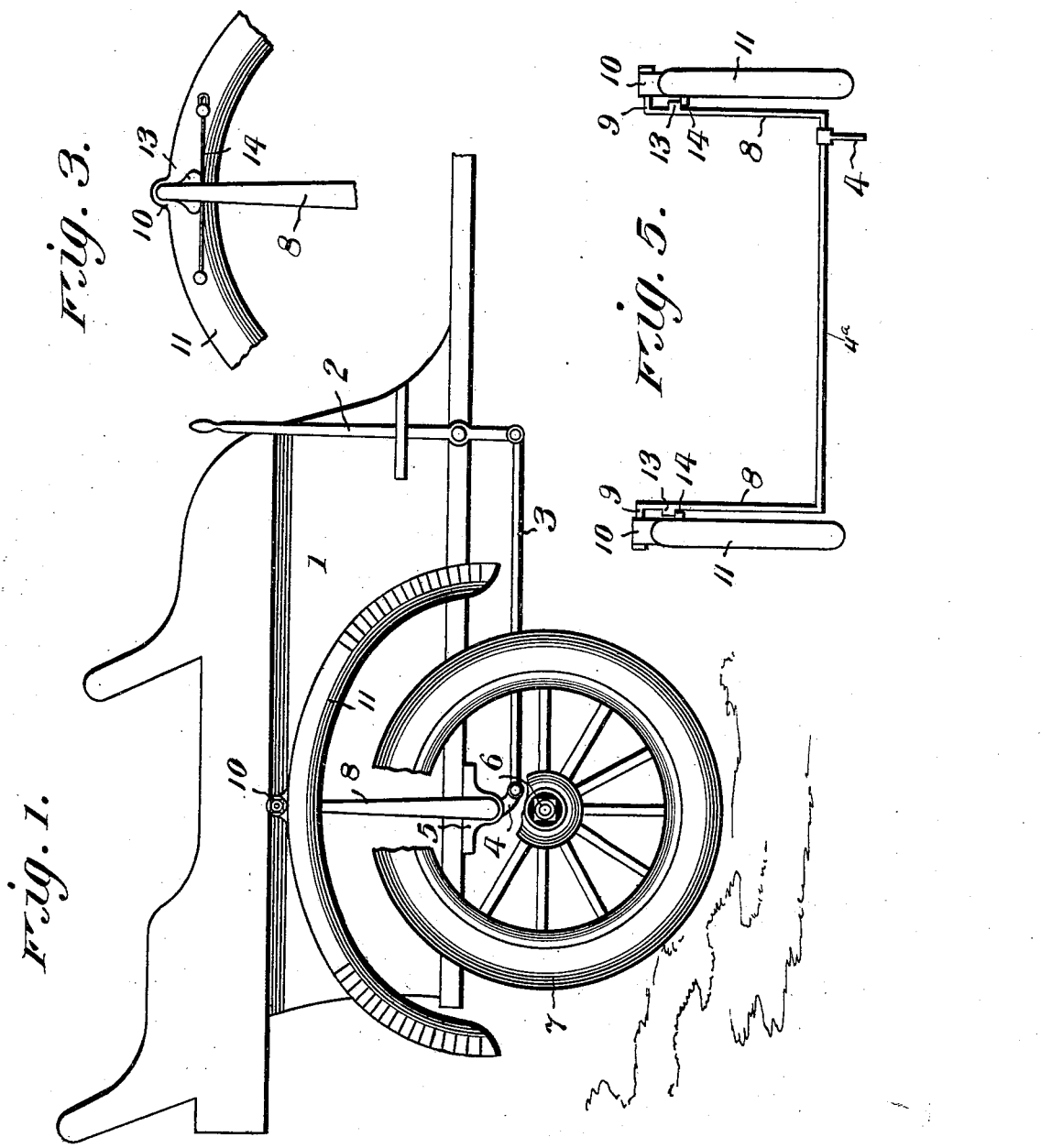
WITNESSES:
INVENTOR
Frank L. Fisher.
BY
Victor J. Evans
Attorney No. 763,871. PATENTED JUNE 28, 1904.
F. L. FISHER.
COMBINED BRAKE AND MUD GUARD.
APPLICATION FILED JAN. 6, 1904.
NO MODEL. 2 SHEETS—SHEET 2.
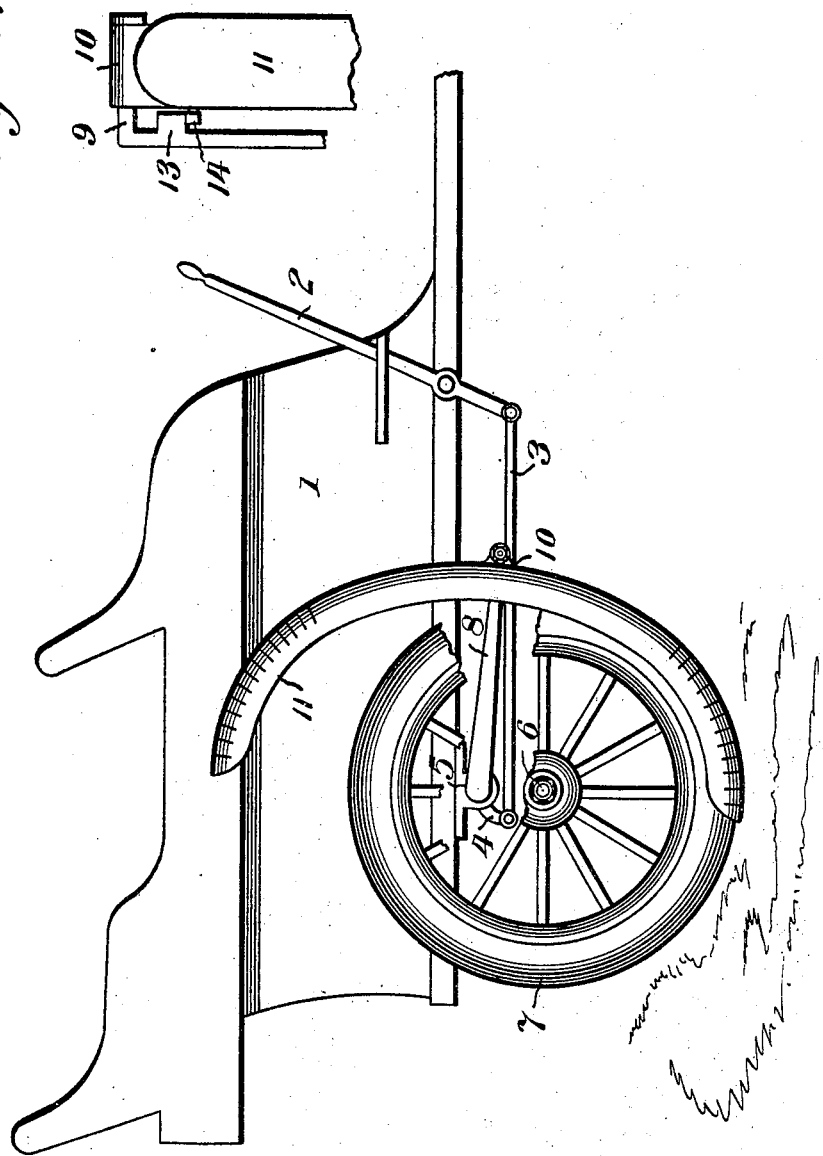
WITNESSES:
INVENTOR
Frank L. Fisher.
BY
Victor J. Evans
Attorney No. 763,871. Patented June 28, 1904.

UNITED STATES PATENT OFFICE.

FRANK L. FISHER, OF CUMBERLAND, MARYLAND.

COMBINED BRAKE AND MUD-GUARD.

SPECIFICATION forming part of Letters Patent No. 763,871, dated June 28, 1904.

Application filed January 6, 1904. Serial No. 187,955. (No model.)

*To all whom it may concern:*

Be it known that I, FRANK L. FISHER, a citizen of the United States, residing at Cumberland, in the county of Allegany and State of Maryland, have invented new and useful Improvements in a Combined Brake and Mud-Guard, of which the following is a specification.

My invention relates to new and useful improvements in combined brakes and mud-guards adapted to be used upon automobiles and other vehicles; and its object is to provide a simple and inexpensive device which can be readily attached to a vehicle and can be quickly converted from a mud-guard into a brake which will stop the vehicle as promptly as desired.

With the above and other objects in view the invention consists of a crank-shank connected to an operating-lever, and arms project from this shaft adjacent the wheels, and each has a mud-guard pivoted thereto, said guard being eccentric with the periphery of the wheel thereunder. Means are provided for holding the guard normally in proper relation to the arm to which it is connected.

The invention also consists in the further novel construction and combination of parts hereinafter more fully described and claimed, and illustrated in the accompanying drawings, showing the preferred form of my invention, and in which—

Figure 1 is a side elevation of a portion of a vehicle having my improved brake and mud-guard connected thereto, a portion of one of the wheels being broken away. Fig. 2 is a similar view showing the mud-guard in use as a brake. Fig. 3 is an inner elevation of the central portion of the mud-guard and showing the connection between it and the arm of the crank-shaft. Fig. 4 is an enlarged end elevation of the parts disclosed in Fig. 3, and Fig. 5 is a detail view of the crank-shank and the guards connected thereto.

Referring to the figures by numerals of reference, 1 is a vehicle of any suitable form, having a lever 2 pivoted thereon at a point within easy access of the person controlling the vehicle. This lever is connected, by means of a rod 3, to an arm 4 on a shaft $4^a$, journaled within brackets 5, secured to the body of the vehicle and at a point preferably in vertical alinement with the axle 6 of the wheels 7. An arm 8 is formed with and extends from the shaft $4^a$ at a point between each wheel 7 and the vehicle-body. The arms 8 are normally held in upright positions and are provided with lateral extensions 9 at their upper ends, which are pivoted within ears 10, formed upon the central portions of corrugated mud-guards 11. Each of these mud-guards is nearly semicircular in form and eccentric with the periphery of the wheel 7 thereunder. It is formed of heavy material and is curved transversely for overlapping the sides of the periphery of the wheel. A lug 13 extends inwardly from each arm 8 near its upper end and is triangular in form, as shown in Fig. 3, and one of its faces bears at all times upon a spring-strip 14, loosely mounted at its ends on the inner side of the guard 11 at points equally removed from the ear 10.

It will be understood that when the lever 2 is in upright position the arms 8 are parallel therewith, and therefore the parts 11 act as mud-guards. When it is desired, however, to stop the vehicle by applying the brake thereto, lever 2 is pressed forward, and arms 8 are moved therewith and cause the front ends of the guards 11 to swing downward into contact with the ground and under the lower portions of the wheels 7. Further forward movement of said wheels is therefore prevented unless the same travel further upon the guards 11; but as this is impossible it will be understood that the vehicle will be quickly brought to a stop. The application of the parts 11 will cause the same to swing and change their relation to the arms 8. However, when the guards 11 are removed from their lowered positions the springs 14, which are pressed downward by the lugs 13 when the guards are swung on their pivots, will return said guards to their proper positions concentric with the wheels 7. The device herein described is especially adapted for use as an emergency-brake and can be moved in front or in rear of the wheels 7, according to the direction in which the vehicle is moving. It can therefore be utilized for holding the vehicle against backward movement should the motive power thereof fail while the device is ascending a grade. By providing corrugated guards the same are prevented from slipping after they have been applied to the wheels.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. The combination with a vehicle having a wheel; of a crank-shaft journaled upon the vehicle, an operating-lever, a rigid connection between said lever and the crank-shaft, an arm extending from the crank-shaft and adjacent the wheel, a mud-guard pivoted to said arm and normally supported thereby above the wheel, a triangular lug upon the arm, and a spring secured to the guard and normally contacted by the lug.

2. The combination with a vehicle-body, and a wheel connected thereto; of a crank-shaft journaled upon the body, an arm extending therefrom between the wheel and body, an extension to the arm, a mud-guard pivoted upon the extension and normally supported above and concentric with the wheel, a triangular lug integral with the arm, a spring secured to the guard and normally contacted by the lug, an operating-lever, and a rod connecting the lever and crank-shaft.

In testimony whereof I affix my signature in presence of two witnesses.

FRANK L. FISHER.

Witnesses:
MICHAEL J. SULLIVAN,
C. F. KEYSER.